United States Patent
Link et al.

(10) Patent No.: US 7,275,616 B2
(45) Date of Patent: Oct. 2, 2007

(54) ADJUSTABLE COMBINATION PROPULSION AND CONTROL HANDLE FOR A WORK MACHINE

(75) Inventors: John F. Link, Calumet City, IL (US); Jay D. Schroeder, Coal Valley, IL (US)

(73) Assignee: CNH America LLC, New Holland, PA (US)

(*) Notice: Subject to any disclaimer, the term of this patent is extended or adjusted under 35 U.S.C. 154(b) by 344 days.

(21) Appl. No.: 11/171,132

(22) Filed: Jun. 30, 2005

(65) Prior Publication Data
US 2007/0000223 A1 Jan. 4, 2007

(51) Int. Cl.
*B60K 26/00* (2006.01)

(52) U.S. Cl. ............................. 180/333; 74/471 XY

(58) Field of Classification Search ............ 180/333, 180/315; 56/10.2 R, 10.2; 403/539; 411/408.1
See application file for complete search history.

(56) References Cited

U.S. PATENT DOCUMENTS

| | | | |
|---|---|---|---|
| 1,591,433 A | | 7/1926 | Pommer |
| 2,770,983 A | | 11/1956 | Hatala ........................ 74/533 |
| 3,742,204 A | | 6/1973 | Price ...................... 240/7.1 R |
| 4,043,220 A | | 8/1977 | Kolb ........................... 74/543 |
| 4,896,558 A | * | 1/1990 | Meier et al. ................ 74/543 |
| 4,981,047 A | | 1/1991 | Denda et al. ............... 74/471 |
| 5,042,314 A | * | 8/1991 | Rytter et al. ............... 74/335 |
| 5,566,778 A | | 10/1996 | Valier et al. .............. 180/334 |
| 5,617,929 A | | 4/1997 | Richardson et al. ....... 180/326 |
| 6,148,593 A | * | 11/2000 | Heinsey et al. ......... 56/10.2 R |
| 6,170,598 B1 | | 1/2001 | Furukawa ................. 180/334 |
| 6,240,802 B1 | | 6/2001 | Miller ........................ 74/523 |
| H2024 H | | 6/2002 | Kelley et al. ............... 74/491 |
| 2002/0170144 A1 | | 11/2002 | Agate, Sr. et al. ........... 16/430 |
| 2003/0037985 A1 | * | 2/2003 | Jeppe et al. .............. 180/333 |
| 2006/0137931 A1 | * | 6/2006 | Berg et al. ................ 180/333 |

FOREIGN PATENT DOCUMENTS

FR 2562847 1/1985

OTHER PUBLICATIONS

Case IH brochure entitled 2300 Series Axial-Flow Combines, © 2003-2004 CNH America LLC.

* cited by examiner

*Primary Examiner*—Paul N. Dickson
*Assistant Examiner*—Robert A. Coker
(74) *Attorney, Agent, or Firm*—Michael G. Harms; John William Stader; Patrick M. Sheldrake

(57) ABSTRACT

A combination propulsion and control handle for a work machine, including an elongate control stalk having a mounting end, an opposite free end, and an internal cavity in connection with an opening in the free end, and a hand grip disposed in overlaying relation to the free end, the hand grip including at least one input device in a position so as to be operable by a finger of a hand grasping the hand grip for causing a change of state of the input device, the at least one input device including at least one elongate conductive element extending therefrom through the opening and the internal cavity of the control stalk, the hand grip being mounted so as to allow simultaneous limited rotation thereof about the control stalk and rotation of the elongate conductive element within the stalk, for allowing varying the positioning of an operator's hand, without twisting of the conductive elements.

23 Claims, 5 Drawing Sheets

ADJUSTABLE COMBINATION PROPULSION AND CONTROL HANDLE FOR A WORK MACHINE

TECHNICAL FIELD

This invention relates generally to a hand operable propulsion handle of a work machine including at least one finger operable input device thereon for controlling a function of the machine, and more particularly, to combined propulsion handle and machine function control which includes a hand grip portion mounted on an upstanding control stalk, the hand grip being rotatable about the stalk to allow positioning a hand grasping the hand grip in a desired orientation about an axis of the stalk, while maintaining at least one finger of the hand in a position for operating the at least one input device, and without causing strain or significant rubbing or twisting of a conductive element connected to the input device or devices.

BACKGROUND ART

Commonly, propulsion handles are provided on work machines such as agricultural combines and the like, which handles are movable in predetermined directions for controlling machine movements and/or speed. Such handles additionally commonly include one or more finger operable controls such as push buttons, and multi-directional toggle switches and paddle switches, and the like, for controlling functions such as speed and position of machine elements such as a reel of a header of a combine, the height and angle of the header, and an unloader auger. Often, an operator must operate a machine such as a combine for many hours a day, for many days, with his or her hand grasping the propulsion handle and manipulating the control buttons and switches thereon for controlling the various machine functions. This can result in fatigue and discomfort, which can make controlling the machine more taxing and less enjoyable. Additionally, the operation of multi-directional switches such as dome switches, toggle switches and paddle switches can require precise and complex fine motor finger manipulations, which are made more difficult by fatigue and other conditions resulting from holding one's hand in the same position for long periods of time.

It is thus desirable to provide one or more means of relieving or forestalling hand fatigue and other problems, which means can involve allowing movements of a hand grip of the control handle. However, if too much movement is allowed, particularly downward movements, the hand may be required to support the hand grip, which can lead to earlier, instead of later, onset of fatigue. Still further, the locating of multiple input devices on a propulsion handle will typically involve routing a corresponding number of conductive elements such as wires and/or optical cables to the input devices, and allowing a large range of movement of the hand grip may place undesirable stress and strain on the conductive elements.

Thus, what is sought is a hand operable propulsion handle of a work machine including at least one finger operable input device, which overcomes one or more of the problems and disadvantages set forth above.

SUMMARY OF THE INVENTION

According to the invention, what is disclosed is an adjustable combination propulsion and control handle for a work machine, which overcomes one or more of the problems and disadvantages set forth above.

According to a preferred aspect of the invention, the combination propulsion and control handle includes an elongate control stalk having a mounting end, a free end opposite the mounting end, and an internal cavity in connection with an opening in the free end. A hand grip is disposed in overlaying relation to at least a portion of the free end of the control stalk, the hand grip including at least one input device in a position so as to be operable by a finger of a hand grasping the hand grip for causing a change of state of the input device. The at least one input device of the hand grip includes at least one elongate conductive element extending therefrom and through the opening and through the internal cavity of the control stalk, the hand grip being mounted so as to allow simultaneous limited rotation thereof about the control stalk and rotation of the at least one elongate conductive element within the stalk. As a result, different operators are able to position his or her hand in a variety of positions and orientations in relation to the control stalk, for such purposes as achieving desired comfort, relieving fatigue, and optimizing fine motor movements of a finger or fingers operating the at least one input device.

According to another preferred aspect of the invention, a hand rest is mounted about a lower region or portion of the hand grip, so as to extend at least partially therearound for supporting a hand gripping the hand grip, and so as to be rotatable with the hand grip relative to the control stalk.

According to another preferred aspect of the invention, the hand grip is retained on the control stalk by at least one retaining element, such as a common fastener such as a screw or the like, a pin such as a roll pin or the like, or other convenient element which passes through the internal cavity of the control stalk and rotates with the hand grip relative to the control stalk, so as to be positioned to contact and urge the conductive element to rotate within the internal cavity when the hand grip is rotated, to eliminate possible twisting or other deformation of the at least one conductive element during the rotation. More preferably, each of the retaining elements extends through a slot in opposite sides of the control stalk so as to support the hand grip in a fixed longitudinal position thereon while allowing the limited rotation of the hand grip about a longitudinal axis through the stalk.

As another preferred aspect of the invention, a layer of a rubbery material can be disposed between the stalk and the hand grip for providing a limited resistance to rotation of the hand grip relative to the stalk.

Also preferably, the at least one retaining element retaining the hand grip on the control stalk is located in spaced relation to the at least one input device, such that a substantial portion of the at least one conductive element can be rotated with the input devices.

According to another preferred aspect of the invention, the work machine is an agricultural combine, and the at least one input device includes a first switch operable for controlling a position of a header of the combine and a second switch operable for controlling a position of a reel of the header. Additional input devices for controlling other functions of a work machine can also be included.

BRIEF DESCRIPTION OF THE DRAWINGS

FIG. 8 is another sectional view of the control stalk;

FIG. 9 is still another sectional view of the control stalk;

DETAILED DESCRIPTION OF THE INVENTION

Figure 1:
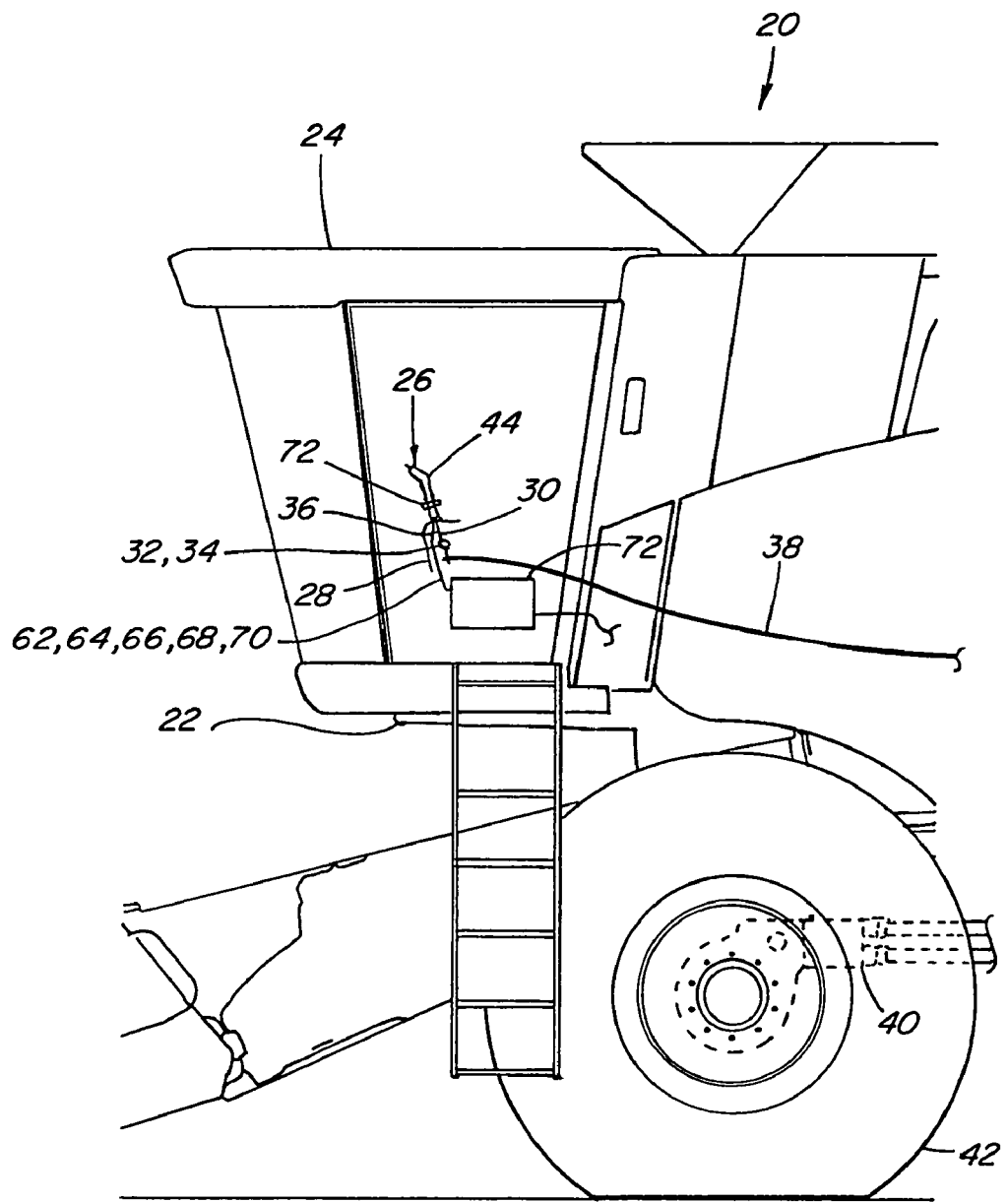
FIG. 1 is a simplified fragmentary schematic representation of a front end of an agricultural combine, including a combination propulsion and control handle according to the invention located in an operator cab of the combine.

Referring now to the drawings, wherein a preferred embodiment of the present invention is shown, in FIG. 1, an agricultural combine 20 is shown, including a front end 22 including an operator cab 24 containing a combination propulsion and control handle 26 constructed and operable according to the teachings of the present invention. Combination propulsion and control handle 26 of the invention is shown disposed on a control console 28, which also serves as an arm rest and is located beside an operator seat (not shown) according to a conventional operator cab configuration.

Combination propulsion and control handle 26 includes an elongate hollow control stalk 30 having a mounting end 32 pivotally mounted at a pivot 34 in connection with console 28, for pivotal movement of an opposite free end 36 of control stalk 30 in a forward and rearward direction, as is well known in the art. Mounting end 32 of control stalk 30 is additionally conventionally connected by a suitable element, such as by a cable 38, to a hydraulic pump powered by an engine (each not shown) of combine 20, which pump supplies pressurized fluid to drive motors 40 connected to front wheels 42 of the combine, for effecting propulsion of the combine, in the well known manner.

Figure 2:
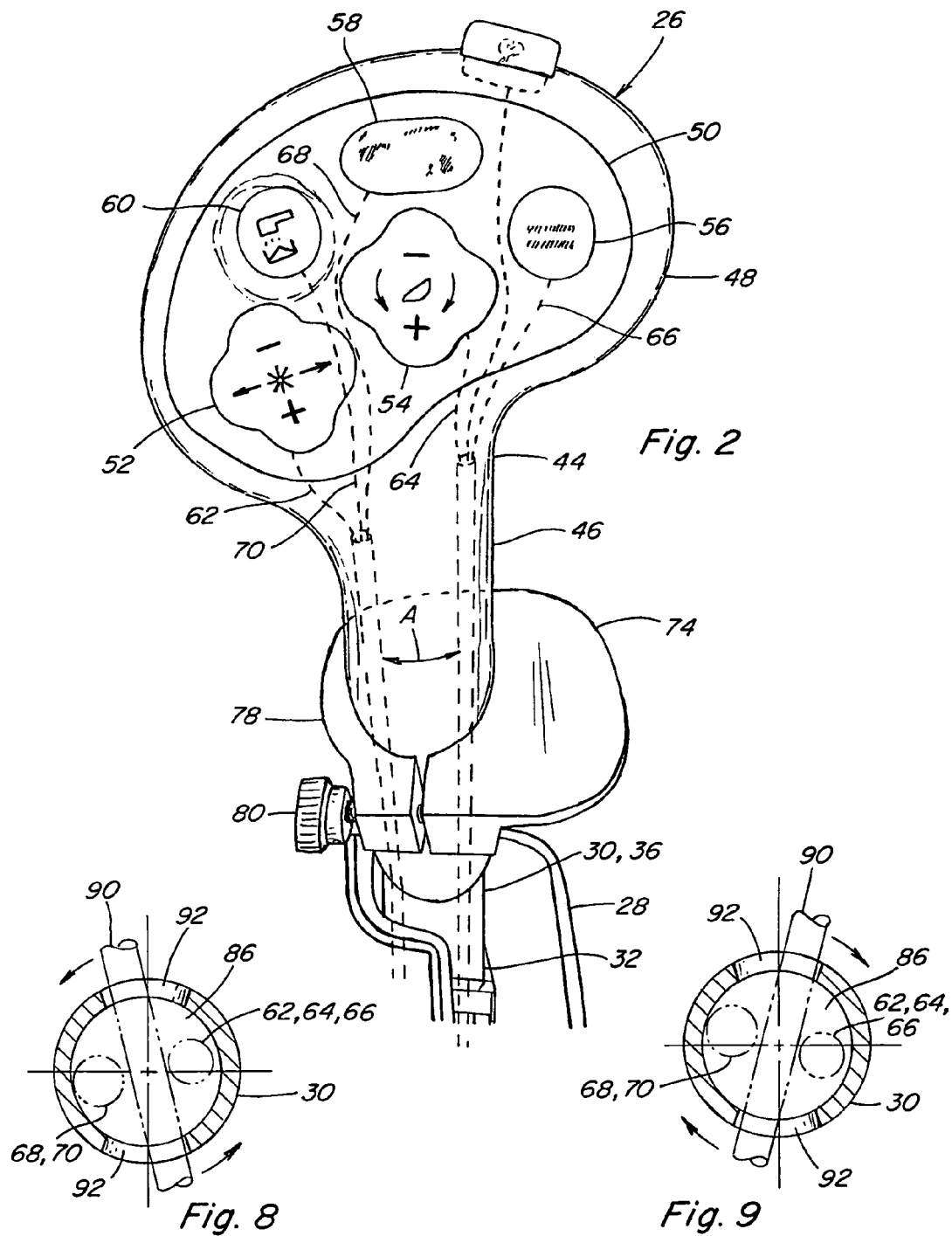
FIG. 2 is an enlarged perspective view of the combination propulsion and control handle of the invention.

Referring also to FIG. 2, a hand grip 44 is disposed on free end 36 of control stalk 30 for limited rotation thereabout, as denoted by arrow A, for such purposes as accommodating operators of different size, stature, arm length, hand size, and the like, and enabling an operator to achieve a comfortable and/or less fatiguing hand and/or arm position, while grasping or gripping hand grip 44 for operating combine 20. This is important, as hand grip 44 is preferably conventionally configured to have a lower portion 46 intended to be gripped in an operator's hand (FIG. 4) with a thumb or other finger or fingers of the hand resting on or in proximity to an upper portion 48 of hand grip 44, which is preferably larger and more bulbous in shape compared to lower portion 46. Here, upper portion 48 is shown including a panel 50 which is significantly larger in cross extent than lower portion 46, and includes at least one, and preferably multiple, input devices, represented by devices 52, 54, 56, 58, and 60, at predetermined locations thereon, in position for operation by a finger or fingers of a hand gripping lower portion 46, as will be illustrated.

Here, input device 52 is preferably a conventionally constructed and operable four-way dome switch which can be, for instance, for controlling location of a reel (not shown) on a header (also not shown) on front end 22 of combine 20; input device 54 is a four-way dome switch which can be operable for controlling height and tilt of the header; input device 56 is a switch or button which can control resumption of an automatic header height control system; input device 58 is a toggle switch operable for controlling deployment of an unloader auger (not shown); and input device 60 is a push button for activating the unloader auger, which are all well known conventional functions of a combine 20.

Here, it should also be noted that panel 50 as well as other portions of hand grip 44 can include a variety of other input devices not shown herein, and input devices 52, 54, 56, 58, and 60 can alternatively be used for controlling a wide variety of other functions, as desired or required. It should also be recognized and understood that the input devices of hand grip 44 can be alternatively integrated into panel 50, in a wide variety of ways, for instance, to comprise commercially available paddle switches or the like.

In either configuration, each of input devices 52, 54, 56, 58, and 60, can be operated to change a state thereof, for effecting a change in the operating state of the device or system controlled thereby, also in the well known manner. In this regard, each of input devices 52, 54, 56, 58, and 60 includes or is connected to a conductive element, here represented by individual conductive elements 62, 64, 66, 68, and 70, which can be, for instance, electrical wires or optical cables, in connection with a suitable device or devices for controlling the indicated functions, such as a controller 72 located beneath or in console 28 (FIG. 1), also in the well known manner.

Figure 3:
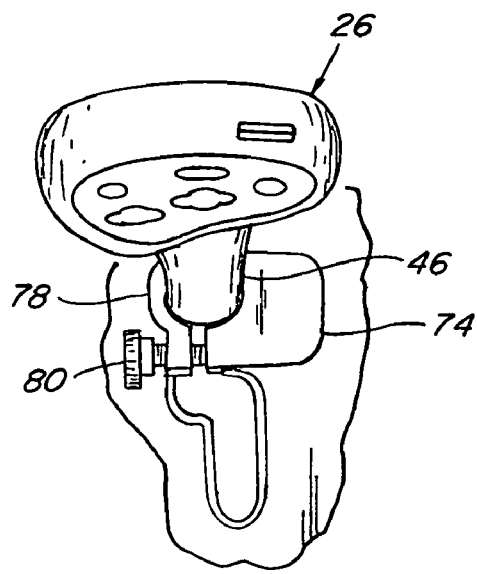
FIG. 3 is a top view of the handle.
Figure 4:
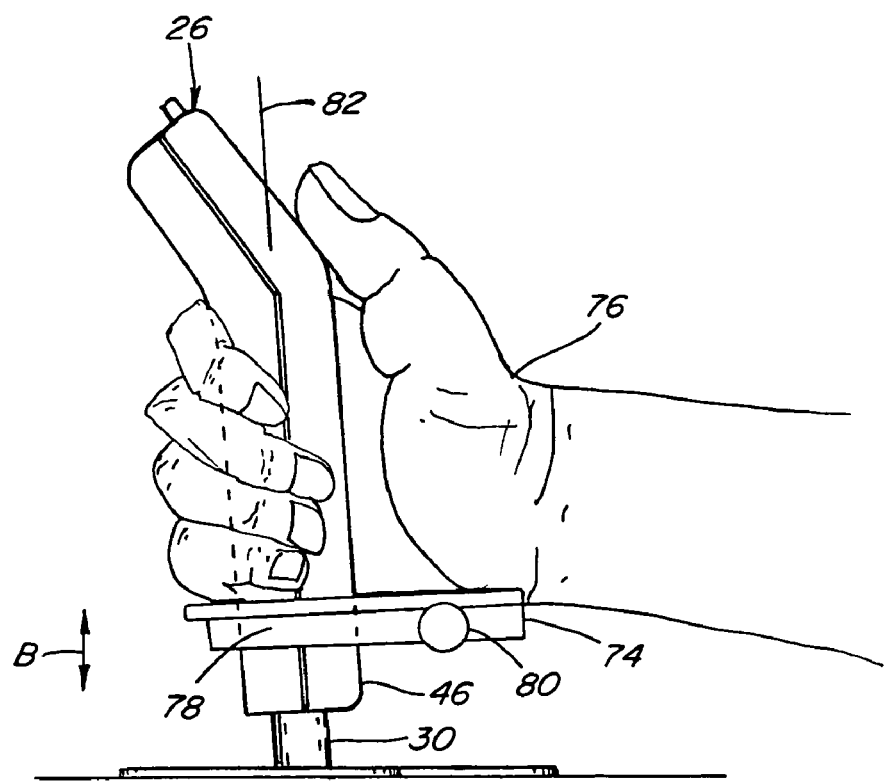
FIG. 4 is a side view of the handle, showing a hand gripping the handle with a finger of the hand operating an input device of the handle.

Referring also to FIGS. 3 and 4, operators of work machines such as combine 20 can be required to sit for long periods of time operating controls of the machine, such as those located on control handle 26. This typically requires holding the arm and hand in a limited range of positions, which can result in discomfort and fatigue, which can lead to dissatisfaction and reduced operator effectiveness. To reduce or forestall onset of discomfort and/or fatigue, propulsion and control handles, such as handle 26 shown can include a hand rest, such as hand rest 74, positioned adjacent a lower region, such as lower portion 46, of the handle, and on which an operator can rest his or her hand, illustrated by hand 76 in FIG. 4.

A hand rest such as hand rest 74 can be adjustable in relation to hand grip 44, such as by use of a clamp 78 which extends partially or completely around lower portion 46 and is secured by a suitable element, such as a threaded fastener 80 shown. In this way, hand rest 74 can be adjusted both height wise, as illustrated by arrows B in FIG. 4, and rotationally in direction A shown in FIG. 2.

However, it has been further found that an operator's hand, wrist and arm can still be subject to undesirable discomfort and fatigue after long periods of grasping the control handle of a work machine. Thus, as a result, it has been found to be further desirable to have the capability for rotatably positioning hand grip 44 in a desired rotational orientation, for instance, about an upwardly and downwardly extending longitudinal axis 82 preferably extending through the center of control stalk 30 (FIG. 4) for enabling, achieving an orientation of a hand, such as hand 76, wrist and/or arm, which relieves or forestalls the onset of discomfort and/or fatigue of any of those body parts and also possibly the back and neck.

Figure 6:
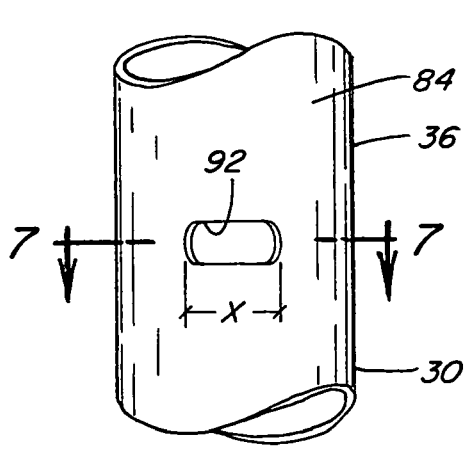
FIG. 6 is a fragmentary view of a control stalk of the handle.
Figure 7:
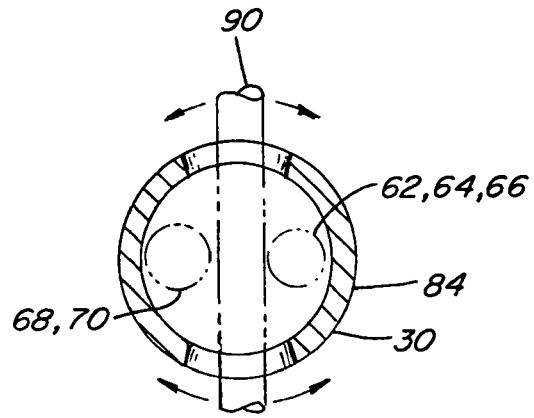
FIG. 7 is a sectional view of the control stalk through line 7-7 of FIG. 6, showing a retaining element and conductive elements extending therethrough.
Figure 5:
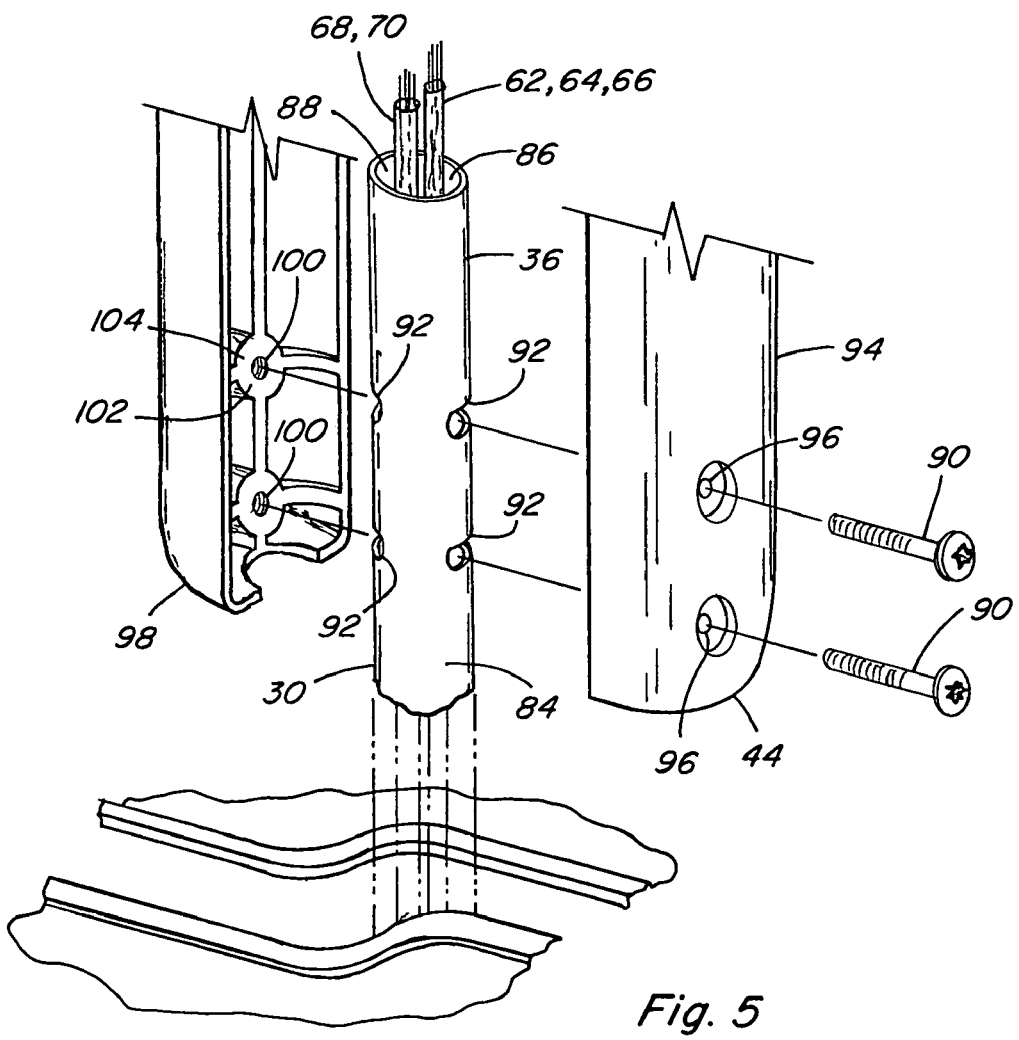
FIG. 5 is a fragmentary exploded perspective view of the handle.

Referring also to FIGS. 5, 6 and 7, such capability is provided by the present invention, which involves supporting hand grip 44 in overlaying relation to free end 36 of control stalk 30 so as to be easily and conveniently rotatable as often as desired, preferably about axis 82 therethrough, as denoted by arrow A in FIG. 2. To facilitate such capability, at least free end 36 of control stalk 30 is preferably of hollow construction, including an outer cylindrical surface 84 and a longitudinally extending internal cavity 86 connecting with an opening 88 preferably located adjacent an upper end of free end 36.

The conductive elements in connection with the one or more input devices on hand grip 44, here, including conductive elements 62, 64, 66, 68 and 70 in connection with input devices 52, 54, 56, 58 and 60, are preferably routed through opening 88 into internal cavity 86 and downwardly through cavity 86 to an opening in or adjacent to mounting end 32 of control stalk 30 en route to their other connections, such as to controller 72 (FIG. 1). Conductive elements 62, 64, 66, 68 and 70 are illustrated as passing through opening 88 and internal cavity 86 in two groups or bundles, but it should be understood that they could alternatively be routed individually or in a greater number of groups or bundles. In any event, it is desirable that the integrity of conductive elements 62, 64, 66, 68 and 70 be protected and maintained, by limiting stressing, straining and twisting of the conductive elements, to the extent necessary.

To achieve this protection, while simultaneously providing a capability of hand grip 44 to be easily and conveniently rotated and repositioned about stalk 30, hand grip 44 is preferably mounted and retained on free end 36 of stalk 30 by at least one, and more preferably two, retaining elements 90 which extend through elongate slots 92 through opposite sides of free end 36 of stalk 30, preferably in longitudinally spaced relation one to the other, through a lower portion or region of free end 36, spaced below devices 52, 54, 56, 58 and 60. Hand grip 44 is preferably of a mating two piece or clamshell construction to facilitate molding from plastics material and assembly, including a side 94 having a pair of holes 96 therethrough, and an opposite mating side 98 having threaded holes 100 therein, holes 96 and 100 being alignable, respectively with slots 92 through opposite sides of free end 36 of control stalk 30 when sides 94 and 98 are brought together, as best illustrated in FIG. 5.

Retaining elements 90 are each preferably a threaded fastener such as a screw or the like, and extend through holes 96 and slots 92, and are threadedly engaged with threaded holes 100, respectively, for holding sides 94 and 98 together about control stalk 30. However, it should be appreciated that other alternative retaining elements, such as a pin, for instance, a roll pin, a rivet, or other device could be used. Each slot 92 has a predetermined sideward extent, denoted by extent X in FIG. 6, which can be, for instance, equal to any amount which would not degrade the structural integrity of stalk 30 required for the present purpose, and which provides a limited range of side to side movement of retaining elements 90 therein, which translates into and provides a corresponding limited amount of rotatability of hand grip 44 about control stalk 30. Cooperative receipt of retaining elements 90 in slots 92 also serves to provide support for hand grip 44 and a portion or all of the weight of a hand or arm resting thereon, and it retains hand grip 44 on stalk 30.

As an additional feature, an internal surface 102 of one or both sides 94 and 98, and/or all or a portion of external surface 84 of stalk 30, can additionally include an optional layer or coating of a suitable rubbery material, such as denoted by rubbery layer 104, or another higher friction material, for providing a desired degree or feel of resistance to rotation of hand grip 44 about stalk 30.

Referring more particularly to FIG. 7 and also to FIGS. 8 and 9, as another feature, conductive elements in connection with the input device or devices of hand grip 44, here represented by conductive elements 62, 64, 66, 68 and 70, are necessarily routed in proximity to and past retaining elements 90 through internal cavity 86. This is advantageous, as it allows elements 90 to contact and urge lower regions of the conductive elements 62, 64, 66, 68 and 70 to rotate simultaneously with hand grip 44 when rotated, such that potentially damaging twisting of the conductive elements does not occur, and any twisting thereof instead occurs more gradually, that is, over a longer portion of the length of the conductive elements. This is best illustrated by the differences in the positions of the respective groups of conductive elements 62, 64, 66, 68 and 70 in FIGS. 7, 8 and 9, as effected by rotation of element 90 within slots 92 as shown by the arrows.

Figure 10:
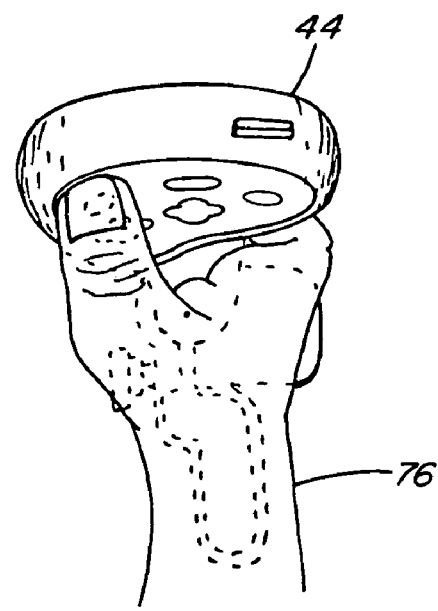
FIG. 10 is another top view of the handle, showing an operator's hand in a first orientation gripping the handle and operating an input device of the handle.
Figure 11:
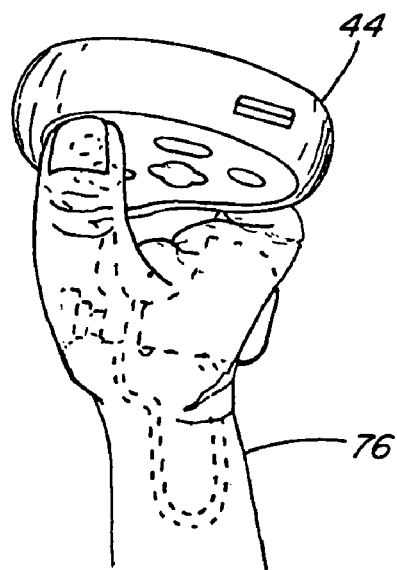
FIG. 11 is another top view of the handle, showing an operator's hand in a second orientation gripping the handle and operating an input device of the handle.
Figure 12:
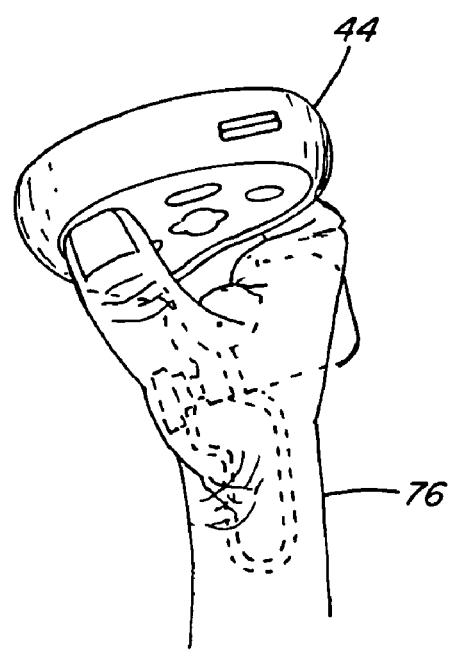
FIG. 12 is another top view of the handle, showing an operator's hand in a third orientation gripping the handle and operating an input device of the handle.

Referring to FIGS. 10, 11 and 12, the capability of rotating hand grip 44 to a variety of positions for achieving different positions of hand 76, and also the wrist and arm, is illustrated. Here it should be observed that such positions are easily achieved and can change as required, including during the range of movement of the control handle forwardly and rearwardly for effecting changes in the rate and/or direction of propulsion. Also, because hand grip 44 is supported by the retaining elements of the invention as explained hereinabove, it is not required for hand 76 to hold hand grip 44 in a particular position or orientation.

It will be understood that changes in the details, materials, steps, and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

What is claimed is:

1. A combination propulsion and control handle for a work machine, comprising:

an elongate control stalk having a mounting end, a free end opposite the mounting end, and an internal cavity in connection with an opening in the free end; and a hand grip disposed in overlaying relation to at least a portion of the free end of the control stalk, the hand grip including at least one input device in a position so as to be operable by a finger of a hand grasping the hand grip for causing a change of state of the input device, the at least one input device including at least one elongate conductive element extending therefrom through the opening and the internal cavity of the control stalk, the hand grip being mounted so as to allow simultaneous limited rotation thereof about the control stalk and rotation of the at least one elongate conductive element within the stalk.

2. The combination propulsion and control handle of claim 1, further comprising a hand rest mounted so as to extend at least partially around a lower region of the hand grip so as to be rotatable therewith relative to the control stalk.

3. The combination propulsion and control handle of claim 1, wherein the hand grip is retained on the control stalk by at least one retaining element which passes through the internal cavity of the control stalk and rotates with the hand grip relative to the control stalk so as to urge the conductive element to rotate within the internal cavity when the hand grip is rotated, to limit twisting of the at least one conductive element during the rotation.

4. The combination of claim 3, wherein the retaining element extends through slots in opposite sides of the control stalk so as to support the hand grip in a fixed longitudinal position thereon while allowing the limited rotation of the hand grip about a longitudinal axis through the stalk.

5. The combination propulsion and control handle of claim 4, comprising two of the retaining elements.

6. The combination of claim 1, wherein at least one input device comprise a plurality of switches.

7. The combination of claim 1, further comprising a layer of a rubbery material disposed between the stalk and the hand grip for providing limited resistance to rotation of the hand grip relative to the stalk.

8. The combination of claim 1, wherein the work machine comprises an agricultural combine, and the at least one input device comprises a first switch operable for controlling a position of a header of the combine and a second switch operable for controlling a position of a reel of the header.

9. The combination of claim 1, wherein the conductive element comprises a wire.

10. An adjustable combination propulsion and control handle for a work machine, comprising:
an elongate control stalk having a mounting end and a free end opposite the mounting end, at least the free end including a longitudinally extending internal passage therein in connection with a opening in the free end; and
a hand grip mounted in overlaying relation to at least a portion of the free end of the control stalk for rotation relative thereto about a longitudinal axis therethrough, the hand grip including an outer surface therearound adapted to be grasped in a hand, the hand grip including a hand rest adjacent to a lower region of the hand grip in position for supporting a hand when grasping the hand grip, and a plurality of input devices on an upper region of the hand grip, each of the input devices being positioned so as to be operable by a finger of a hand resting on the hand rest and grasping the hand grip, the input devices including at least one elongate conductive element extending therefrom and routed through the opening into the internal cavity of the control stalk and downwardly through the internal cavity, and the hand grip being mounted on the control stalk by at least one retaining element extending transversely through the stalk thereby allowing simultaneous limited rotation of the hand grip and the at least one conductive element relative to the stalk about the axis.

11. The adjustable combination propulsion and control handle of claim 10, wherein the free end of the control stalk includes at least one elongate slot therein in connection with the internal cavity and extending transversely relative to the axis, the slot having a predetermined transverse extent, the at least one retaining element extending through the slot for retaining the hand grip on the stalk and allowing a range of limited rotation of the hand grip about the stalk about equal to the transverse extent of the slot.

12. The adjustable combination propulsion and control handle of claim 11, wherein the at least one retaining element comprises an elongate fastener which passes through a pair of the slots located in opposing relation one to the other on opposite sides of the internal cavity of the stalk.

13. The adjustable combination propulsion and control handle of claim 12, comprising at least two of the retaining elements located at longitudinally spaced locations along the stalk in position for causing simultaneous rotation of the at least one conductive element within the stalk when the hand grip is rotated relative to the stalk, to limit twisting of the at least one conductive element.

14. The adjustable combination propulsion and control handle of claim 10, wherein the at least one input device comprise a plurality of switches.

15. The adjustable combination propulsion and control handle of claim 11, further comprising a layer of a rubbery material disposed between the stalk and the hand grip for providing limited resistance to rotation of the hand grip relative to the stalk.

16. The adjustable combination propulsion and control handle of claim 11, wherein the work machine comprises an agricultural combine, and the at least one input device comprises a first switch operable for controlling a position of a header of the combine and a second switch operable for controlling a position of a reel of the header.

17. The adjustable combination propulsion and control handle of claim 10, wherein the conductive element comprises a wire.

18. A combination propulsion and control handle for a work machine, comprising:
a generally upstanding elongate control stalk having a lower mounting end and an upper free end, at least the free end including a longitudinally extending internal passage therein in connection with a opening in the free end; and
a hand grip disposed in overlaying relation to at least a portion of the free end of the control stalk, the hand grip including an outer surface therearound adapted to be grasped in a hand, the hand grip including a hand rest adjacent to a lower portion of the hand grip in position for supporting a hand when grasping the hand grip, and a plurality of input devices on an upper portion of the hand grip, each of the input devices being positioned so as to be operable by a finger of a hand resting on the hand rest and grasping the hand grip, the input devices including at least one elongate conductive element extending therefrom and routed through the opening into the internal cavity of the control stalk and downwardly through the internal cavity, the hand grip being retained on the control stalk by at least one retaining element extending transversely through a lower portion of the hand grip and through transversely extending slots through the stalk and into the internal cavity thereof, for preventing upward and downward movement of the hand grip relative to the stalk while allowing limited rotation of the hand grip about the stalk and simultaneous limited rotation of the at least one conductive element within the internal cavity of the stalk when the hand grip is rotated.

19. The combination propulsion and control handle of claim 18, comprising at least two of the retaining elements located at longitudinally spaced locations along the stalk in position for causing simultaneous rotation of the at least one conductive element with in the stalk when the hand grip is rotated relative to the stalk, to limit twisting of the at least one conductive element.

20. The combination propulsion and control handle of claim 18, wherein the at least one input device comprise a plurality of switches.

21. The combination propulsion and control handle of claim 18, further comprising a layer of a rubbery material disposed between the stalk and the hand grip for providing limited resistance to rotation of the hand grip relative to the stalk.

22. The combination propulsion and control handle of claim 18, wherein the work machine comprises an agricultural combine, and the at least one input device comprises a first switch operable for controlling a position of a header of the combine and a second switch operable for controlling a position of a reel of the header.

23. The combination propulsion and control handle of claim 18, wherein the conductive element comprises a wire.

* * * * *